(12) United States Patent
Tani

(10) Patent No.: US 8,326,005 B2
(45) Date of Patent: Dec. 4, 2012

(54) GUIDE APPARATUS, IMAGE PICKUP APPARATUS, IMAGE PICKUP SYSTEM, AND GUIDE METHOD

(75) Inventor: Shiro Tani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1049 days.

(21) Appl. No.: 12/195,672

(22) Filed: Aug. 21, 2008

(65) Prior Publication Data

US 2009/0123041 A1  May 14, 2009

(30) Foreign Application Priority Data

Nov. 12, 2007 (JP) .................................. 2007-292759

(51) Int. Cl.
*G06K 9/00* (2006.01)
(52) U.S. Cl. ........ 382/126; 382/124; 382/115; 382/116; 382/117; 382/118
(58) Field of Classification Search .................. 382/124, 382/126, 115–118
See application file for complete search history.

(56) References Cited

U.S. PATENT DOCUMENTS

| | | | | |
|---|---|---|---|---|
| 5,483,601 | A * | 1/1996 | Faulkner | 382/115 |
| 6,101,405 | A * | 8/2000 | Yasuda et al. | 600/310 |
| 6,175,407 | B1 * | 1/2001 | Sartor | 356/71 |
| 6,937,748 | B1 * | 8/2005 | Schneider et al. | 382/126 |
| 7,431,702 | B2 * | 10/2008 | Rahe-Meyer | 600/587 |
| 7,580,552 | B2 * | 8/2009 | Yoshizu et al. | 382/115 |
| 7,697,730 | B2 * | 4/2010 | Okamura et al. | 382/115 |
| 7,725,733 | B2 * | 5/2010 | Higashiura et al. | 713/186 |
| 7,899,217 | B2 * | 3/2011 | Uludag et al. | 382/115 |
| 7,978,259 | B2 * | 7/2011 | Matsuo et al. | 348/370 |
| 8,000,503 | B2 * | 8/2011 | Kamata et al. | 382/115 |
| 2002/0048014 | A1 * | 4/2002 | Kono et al. | 356/71 |
| 2003/0072475 | A1 * | 4/2003 | Tamori | 382/124 |
| 2003/0103686 | A1 * | 6/2003 | Ogura | 382/321 |
| 2004/0022421 | A1 * | 2/2004 | Endoh et al. | 382/115 |
| 2004/0264742 | A1 * | 12/2004 | Zhang et al. | 382/115 |

(Continued)

FOREIGN PATENT DOCUMENTS

JP           11-47119           2/1999

(Continued)

OTHER PUBLICATIONS

Japanese Office Action dated Nov. 8, 2011 issued in corresponding Japanese Patent Application No. 2007-292759.

*Primary Examiner* — Jayesh A Patel
(74) *Attorney, Agent, or Firm* — Staas & Halsey LLP

(57) ABSTRACT

An image pickup apparatus has a placement portion having an opening portion, a finger guide, a wrist guide, and a photographing device provided in the opening portion. When a user's left or right hand is placed on the placement portion, the second joints of a plurality of fingers are placed on the planar surface of the placement section, and the middle finger is positioned by the finger guide. The wrist guide, which is provided on the opposite side of the finger guide on the upper surface of the image pickup apparatus with respect to the opening portion, has a pair of inclined surfaces and, when the palm is placed on the placement portion, the both end sides of the wrist contact the inclined surfaces to be positioned. Further, the wrist guide moves downward so as to keep the palm parallel to the opening plane of the opening portion.

20 Claims, 9 Drawing Sheets

U.S. PATENT DOCUMENTS

| | | | |
|---|---|---|---|
| 2005/0047632 A1* | 3/2005 | Miura et al. | 382/124 |
| 2005/0094855 A1* | 5/2005 | Proano et al. | 382/124 |
| 2005/0273027 A1* | 12/2005 | Farrell et al. | 602/21 |
| 2006/0211964 A1* | 9/2006 | Farrell et al. | 602/5 |
| 2007/0270666 A1* | 11/2007 | Amano et al. | 600/300 |
| 2008/0034459 A1* | 2/2008 | Nordt et al. | 2/16 |
| 2008/0192988 A1* | 8/2008 | Uludag et al. | 382/115 |
| 2008/0226136 A1* | 9/2008 | Takaku et al. | 382/115 |

FOREIGN PATENT DOCUMENTS

| | | |
|---|---|---|
| JP | 2002-298128 | 10/2002 |
| JP | 2006-99493 | 4/2006 |
| JP | 2006-318018 | 11/2006 |
| JP | 2006-331239 | 12/2006 |
| JP | 2007-280298 | 10/2007 |
| JP | 2007280298 | * 10/2007 |

* cited by examiner

GUIDE APPARATUS, IMAGE PICKUP APPARATUS, IMAGE PICKUP SYSTEM, AND GUIDE METHOD

BACKGROUND OF THE INVENTION

1. Field of the Invention

The present invention relates to a guide apparatus for guiding a palm to a position suitable for photographing, an image pickup apparatus, am image pickup system, and a guide method.

2. Description of the Related Art

In recent years, biometrics technology has increasingly been used as a substitute for authentication using a password or card. Fingerprint and iris, etc. have widely been used as biometrics authentication data. Within this field, "vein authentication", which uses image recognition and optical technology to scan the normally invisible vein pattern of the palm, back of the hand, fingers, etc. has the properties of being highly accurate and highly resistant to counterfeiting, impersonation, and other dishonest actions.

Hemoglobin (reduced hemoglobin) in the red corpuscle flowing in a vein that has lost oxygen absorbs the near infrared radiation in the 760 nm wavelength region. Based on the above property, in the vein authentication, the palm is irradiated with the near infrared ray, and the location of veins is recognized by the degree of strength of the reflected near infrared ray. In particular, non-contact vein authentication system that performs authentication without giving user a feeling of reluctance by photographing veins of the palm in a non-contact manner is now widely used.

In order to perform the non-contact vein authentication, it is necessary for a user to place his or her palm on a specific position for registration of veins and to place the palm on the same position at authentication time. Thus, a guide apparatus for guiding the palm of the user to the same position both at the registration time and authentication time is used. In the following, a conventional guide apparatus will be described with reference to the accompanying drawings.

FIG. 11 is a view showing a conventional guide apparatus, and FIG. 12 is a view showing another conventional guide apparatus.

As shown in FIG. 11, a guide apparatus 5 has a wrist guide 201, a middle finger guide 202, and a non-contact sensor unit 40. The wrist guide 201 fixes the wrist of a user to be subjected to the vein authentication, middle finger guide 202 fixes the middle finger of the user, and non-contact sensor unit 40 photographs the palm of the user fixed by the wrist guide 201 and middle finger guide 202.

Further, as shown in FIG. 12, a guide apparatus 6 has a wrist guide 301' a middle finger guide 302, a placement portion 303, and a non-contact sensor unit 40. The wrist guide 301 fixes the wrist of a user to be subjected to the vein authentication, middle finger guide 302 fixes the middle finger of the user, placement portion 303 guides the user's hand to be placed on the guide apparatus 6 in such a manner to spread his or her fingers, and non-contact sensor unit 40 photographs the palm of the user fixed by the wrist guide 301, middle finger guide 302, and placement portion 303.

As a prior art relating to the present invention, there is known a method and apparatus for positioning a living body (refer to, e.g., Patent Document 1: Jpn. Pat. Appln. Laid-Open Publication No. 11-47119)

However, in the guide apparatus 5, the position of the palm relative to the non-contact sensor unit 40 may change in the direction denoted by the arrow between the registration time and authentication time, as shown in FIG. 13 and, further, the degree of spread of the fingers may change between the registration time and authentication time. Further, in the guide apparatus 6, in the case where the width of the user's wrist is smaller than the width set by the wrist guide 301, the wrist guide 301 cannot fix the user's wrist as shown in FIG. 14, which may cause a change in the position of the user's wrist in the direction denoted by the arrow between the registration time and authentication time. As a result, the non-contact sensor unit 40 may photograph different portions of the palm between the registration time and authentication time. In this case, although the palm of the same user is subjected to the vein authentication, the vein pattern is determined to be different from that at the registration time, with the result that the relevant user is not authenticated.

In order to carry out the non-contact vein authentication smoothly, it is necessary to guide the user that he or she places his or her palm on the same position both at the registration time and authentication time. Further, the size of the palm or wrist differs greatly in individuals, so that a mechanism that enables alt users to place their palms on the same position relative to the non-contact sensor unit 40 is required.

SUMMARY OF THE INVENTION

The present invention has been made to solve the above problems, and an object thereof is to provide a guide apparatus, an image pickup apparatus, an image pickup system, and a guide method capable of guiding palms of various sizes to a position suitable for photographing.

To solve the above problem, according to a first aspect of the present invention, there is provided a guide apparatus that guides a palm to be photographed by an image pickup apparatus to a position suitable for photographing, including: a placement portion that has a planar surface on which the palm is placed in the image pickup direction of the image pickup apparatus and that supports the palm placed on the planar surface so that the palm can be photographed by the image pickup apparatus through an opening formed in the planar surface; a finger guide that is provided on the placement portion at the one end side of the opening and formed of two finger guide members with a predetermined distance therebetween and that positions a predetermined finger between the finger guide members; and a wrist guide that is provided on the placement portion at the other end side (opposite to the one end side) of the opening in a V-shaped manner with respect to the image pickup direction of the image pickup apparatus for supporting a wrist and that is movably arranged such that when the wrist is brought into contact with the V-shaped inclined surface, the wrist guide is moved by the load of wrist and guides the wrist in the inclined direction while moving the palm to a predetermined position with respect to the opening in cooperation with the finger guide.

According to a second aspect of the present invention, there is provided an image pickup apparatus, including: an image pickup section that photographs a palm; a placement portion that has a planar surface on which the palm is placed in the image pickup direction of the image pickup section and that supports the palm placed on the planar surface so that the palm can be photographed by the image pickup section through an opening formed in the planar surface; a finger guide that is provided on the placement portion at the one end side of the opening and that positions a predetermined finger placed on the placement portion; and a wrist guide that is provided on the placement portion at the other end side (opposite to the one end side) of the opening in a V-shaped manner with respect to the image pickup direction of the image pickup section for supporting a wrist and that is movably arranged such that when the wrist is brought into contact with the V-shaped inclined surface, the wrist guide is moved by the load of wrist and guides the wrist in the inclined direction while moving the palm to a predetermined position with respect to the opening in cooperation with the finger guide.

According to a third aspect of the present invention, there is provided an image pickup system, including: an image pickup section that photographs a palm; a placement portion that has a detection section for detecting the palm set at a position at which the image pickup section can photograph the palm and a planar surface on which the palm is placed in the image pickup direction of the image pickup section and that supports the palm placed on the planar surface so that the palm can be photographed by the image pickup section through an opening formed in the planar surface; a finger guide that is provided on the placement portion at the one end side of the opening and that positions a predetermined finger placed on the placement portion; a wrist guide that is provided on the placement portion at the other end side (opposite to the one end side) of the opening in a V-shaped manner with respect to the image pickup direction of the image pickup section for supporting a wrist and that is movably arranged such that when the wrist is brought into contact with the V-shaped inclined surface, the wrist guide is moved by the load of wrist and guides the wrist in the inclined direction while moving to position the palm to a predetermined position with respect to the opening in cooperation with the finger guide; and a control unit that allows the image pickup section to photograph the palm in the case where the detection section detects the palm.

According to a fourth aspect of the present invention, there is provided a guide method that guides a palm to a position suitable for photographing in the case where a camera provided in a casing is used to photograph, through an opening formed in the casing, the palm which is guided to the front of the opening, including: providing, at the one end side of the opening, a finger guide for positioning a predetermined finger, and providing, at the other end side (opposite to the one end side) of the opening, a wrist guide for positioning a wrist, wherein when the wrist is brought into contact with an inclined surface provided in a V-shaped manner with respect to the image pickup direction, the wrist guide is moved by the load of wrist and guides the wrist in the inclined direction while moving the palm to a predetermined position with respect to the opening in cooperation with the finger guide.

According to the present invention, a guide apparatus, an image pickup apparatus, an image pickup system, and a guide method capable of guiding palms of various sizes to a position suitable for photographing can be provided.

DETAILED DESCRIPTION OF THE PREFERRED EMBODIMENTS

An embodiment of the present invention will be described below with reference to the accompanying drawings.

Figure 1:
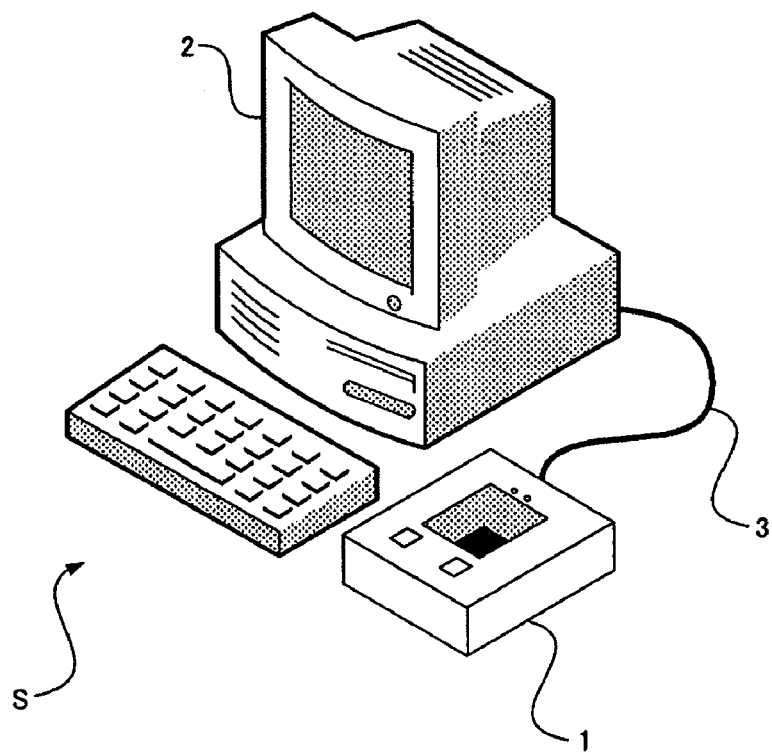
FIG. 1 is a view showing an image pickup system according to an embodiment of the present invention.
Figure 2:
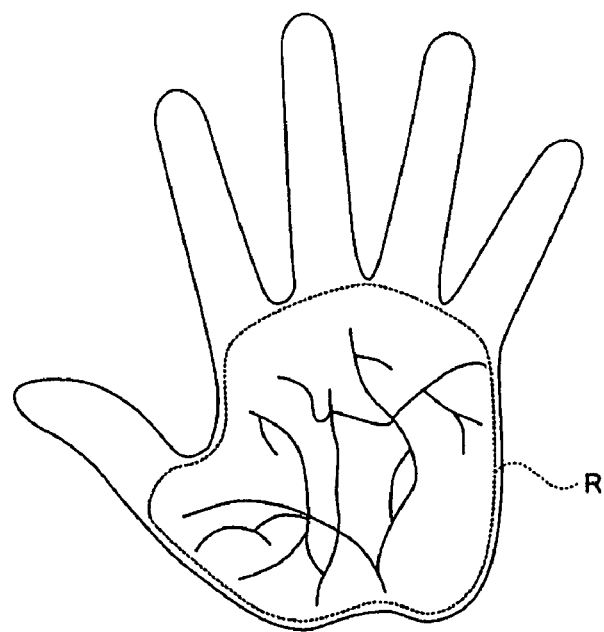
FIG. 2 is a view showing the image pickup range in palm vein authentication.

First, the outline of the present embodiment will be described. FIG. 1 is a view showing an image pickup system according to the present embodiment, and FIG. 2 is a view showing the image pickup range in palm vein authentication.

An image pickup system S includes an image pickup apparatus 1 (guide apparatus) and a personal computer 2 (control apparatus). The image pickup apparatus 1 and personal computer 2 are connected to each other by a USB cable 3. In the present embodiment, it is assumed that non-contact vein authentication is conducted for a user to login to the personal computer 2, and that the user has previously registered, in the personal computer 2, a vein pattern within a vein range R shown in FIG. 2 of a palm of his or her left or right hand by using the image pickup apparatus 1 and performs authentication at the is login time using the palm of the same hand.

Further, in the present embodiment, it is assumed that processing concerning the non-contact vein authentication and power supply to the image pickup apparatus 1 are made by the personal computer 2 using the USB cable 3. The personal computer 2 may be any apparatus, such as an ATM, as long as it can execute processing concerning the non-contact vein authentication. Further, the USB cable 3 may be any configuration as long as it can connect the image pickup apparatus 1 to an apparatus that executes processing concerning the vein authentication.

Figure 3:
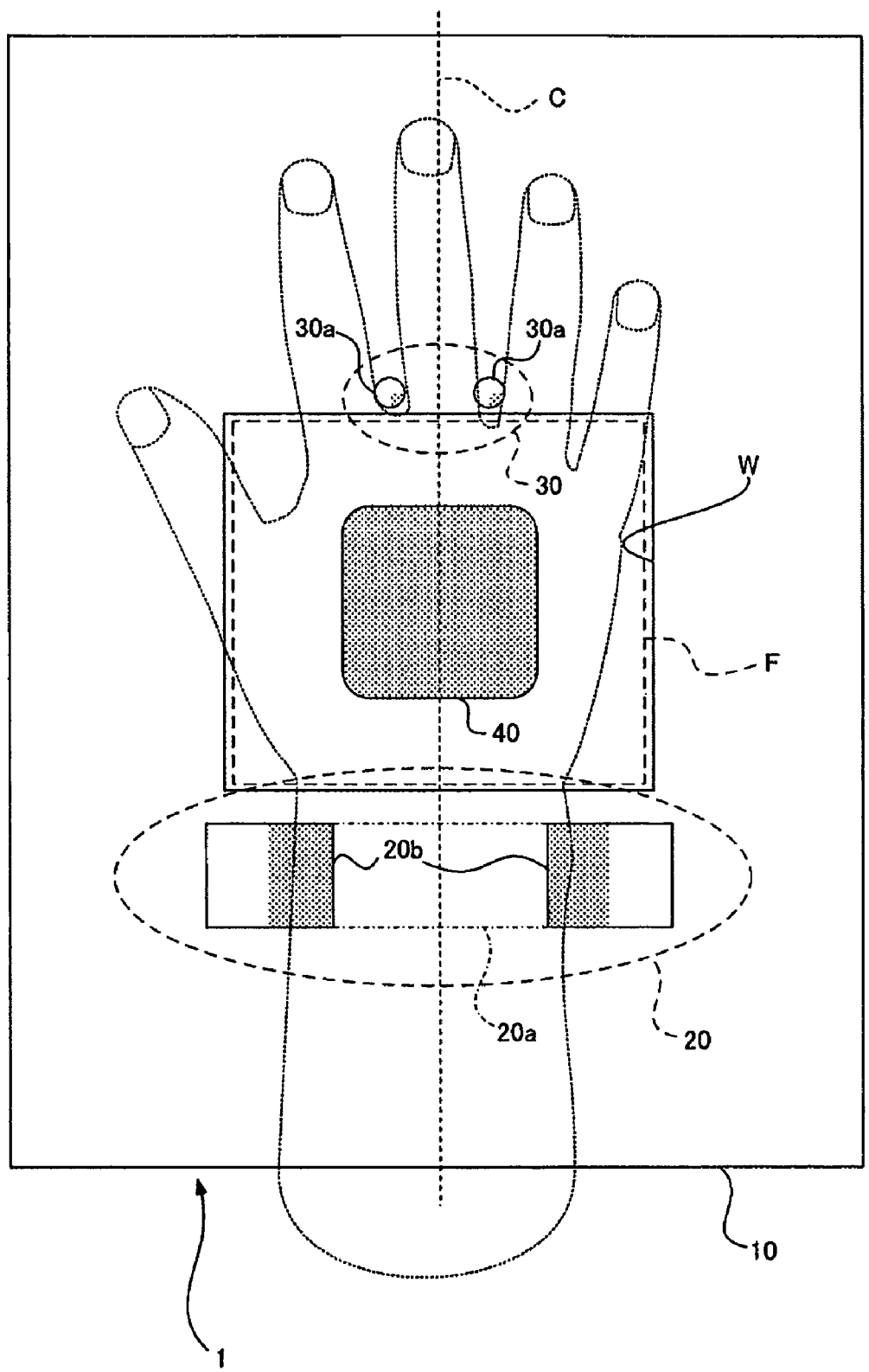
FIG. 3 is a view showing a configuration of an image pickup apparatus according to the present embodiment.
Figure 4:
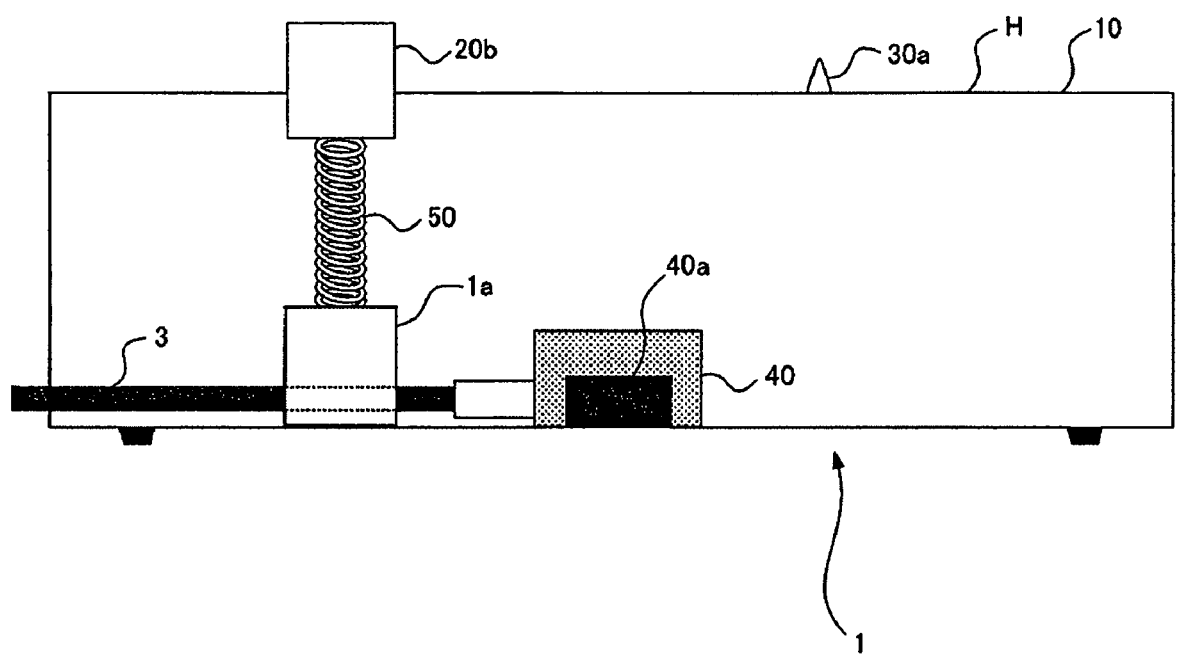
FIG. 4 is a view showing a configuration of the image pickup apparatus according to the present embodiment.

A description will next be given of the image pickup apparatus according to the present embodiment. FIGS. 3 and 4 are views showing a configuration of the image pickup apparatus according to the present embodiment. FIG. 3 is a top perspective view of the image pickup apparatus, and FIG. 4 is a side perspective view thereof.

As shown in FIGS. 3 and 4, the image pickup apparatus 1 has a placement portion 10, a wrist guide 20 provided on the placement portion 10, a middle finger guide 30 (finger guide) provided on the placement portion 10, a non-contact sensor unit 40 having a camera 40a, and a detachable USB cable 3. The non-contact sensor unit 40 has a not-shown USB connection portion.

The placement portion 10, wrist guide 20, and middle finger guide 30 constitutes a palm guide apparatus in the present embodiment.

The placement portion 10 has a planar surface H perpendicular to the image pickup direction of the image pickup apparatus 1 (image pickup direction of the camera 40a) and supports a palm placed on the planar surface H such that the camera 40a can photograph the palm through an opening portion W formed in the planar surface H. The opening portion W is formed above the non-contact sensor unit 40 and is made to have a size slightly larger than an image pickup range F of the non-contact sensor unit 40 at a portion corresponding to the image pickup range F. The non-contact sensor unit 40 is has a camera 40a and photographs the vain pattern on the palm within the image pickup range F.

The wrist guide 20 has, at the center thereof, a flat portion 20a and has, at both ends thereof projection portions 20b and 20b having inclined surfaces VF facing each other. The wrist guide 20 is so formed as to project upward from the planar surface H. Further, the wrist guide 20 is so supported by an appropriate portion (support member) 1 of the casing of the image pickup apparatus 1 through a compression coil spring 50 attached to the lower surface of the wrist guide 20 as to be movable in the up-down direction. The height of the flat portion 20a of the wrist guide 20 is substantially the same as the height of the placement portion 10 and, when the wrist is placed on the flat portion 20a, the wrist guide 20 moves downward until the wrist or its surrounding portion is brought into contact with the planar surface of the placement portion 10.

Then, in cooperation with the finger guide 30, the wrist guide 20 guides the wrist downward for positioning until the wrist is brought into contact with the planar surface so that the palm placed on the placement portion 10 is adequately photographed. The inclined surfaces VF of the projection portions 20b and 20b are inclined such that the distance between the projection portions 20b and 20b is narrower at the lower portion than at the upper portion. Further, in the present embodiment, the two projection portions 20b and 20b of the wrist guide 20 project from the planar surface H such that their inclined surfaces on which the wrist is placed are away from each other. That is, although the projection portions 20b and 20b are so formed as to project upward from two holes formed in the planar surface H, the hole may be formed in the planar surface H such that the entire wrist guide 20 as viewed from the above faces outside the placement portion, as long as the height of flat portion 20a of the wrist guide 20 is the same as the height of the planar surface H.

The middle finger guide 30 is constituted by two cone-like projections (finger guide members) 30a and 30a. The projections 30a and 30a are provided on the placement portion with a predetermined distance therebetween so that the middle finger is positioned to the center therebetween.

The above wrist guide 20, middle finger guide 30, and non-contact sensor unit 40 are arranged such that the centers thereof are arranged on a center line C of the placement portion 10 as shown in FIG. 3. By placing a hand on the placement portion 10 such that the wrist is fixed by the wrist guide 20 and middle finger is fixed by the middle finger guide 30, the palm can be set at the same position both at the registration time and authentication time.

Further, by fixing the middle finger on the center line C, it is possible for a user to correctly position the palm regardless of whether a left or right hand is placed. Further, when the palm is placed on the placement portion, the palm is fixed in an opened state, thereby preventing the degree of spread of the fingers from changing between the registration time and authentication time. Furthermore, in this configuration, the thumb and little fingers are placed on the placement portion 10, and middle finger and wrist are fixed, so that the angle of the palm relative to the non-contact sensor unit 40 is always kept constant. For example, the palm face is set parallel to the opening plane of the opening portion W.

It is assumed in the following description that the middle finger guide 30 side and wrist guide 20 side of the placement portion 10 are referred to as "front side" and "rear side" thereof. The middle finger guide 30 may be a guide for another finger.

Figure 5:
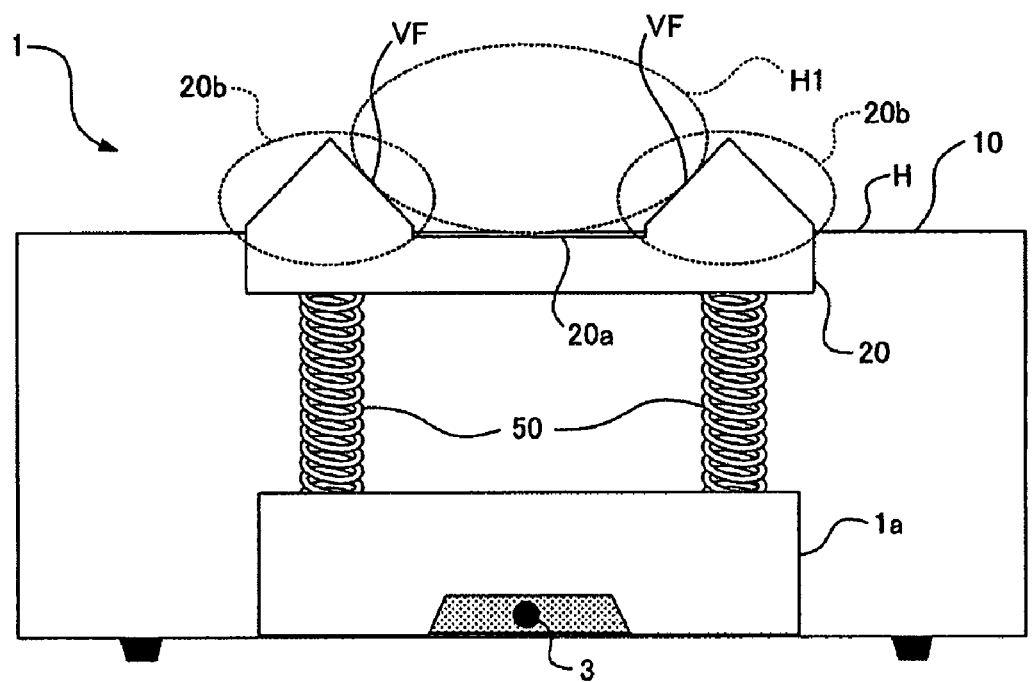
FIG. 5 is a view showing a state of a wrist guide in the case where a comparatively thin wrist is placed thereon.

A description will next be given of operation of the wrist guide of the image pickup apparatus. FIG. 5 is a view showing a state of the wrist guide in the case where a comparatively thin wrist is placed thereon, and FIG. 6 is a view showing a state of the wrist guide in the case where a comparatively thick wrist is placed thereon.

As shown in FIG. 5, when a comparatively thin wrist H1, i.e., a thin wrist H1 having a width which can be accommodated within the shortest distance (distance between the projection portions 20b and 20b at their top positions) between the left and right projection portions 20b and 20b is placed on the wrist guide 20, the wrist contacts the planar surface H, so that the wrist guide 20 does not move downward. Note that even in the configuration where the entire wrist guide 20 is exposed from the planar surface H, the wrist guide 20 does not move downward, because the height of the flat portion 20a of the wrist guide 20 is made equal to the height of the planar surface H of the placement portion to cause the portion surrounding the wrist to contact the planar surface of the placement portion 10.

Figure 6:
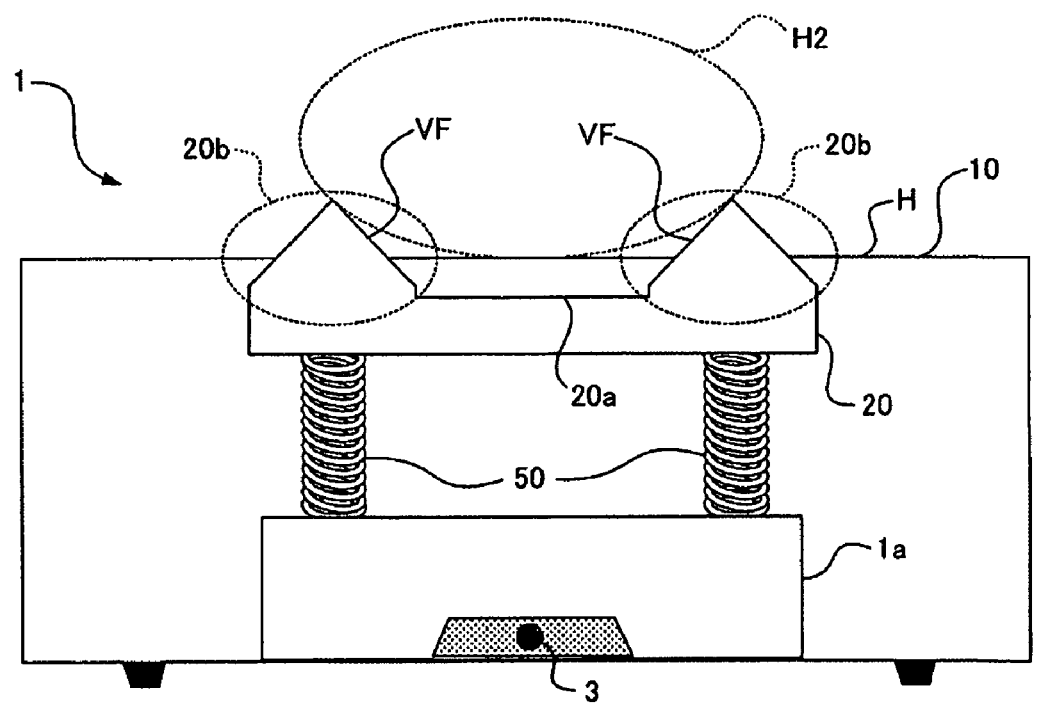
FIG. 6 is a view showing a state of a wrist guide in the case where a comparatively thick wrist is placed thereon.

On the other hand, as shown in FIG. 6, when a comparatively thick wrist H2, i.e., a thick wrist H2 having a width larger than the shortest distance (distance between the projection portions 20b and 20b at their top positions) between the left and right projection portions 20b and 20b is placed on the wrist guide 20, the wrist guide 20 is pressed down until the wrist H2 contacts the planar surface H of the placement portion 10, so that the distance between the left and right projection portions 20b of the wrist guide 20 at the height of the planar surface H is made larger. In such a manner, the wrist guide 20 can accommodate wrists of various sizes.

With the above configuration, it is possible to guide the wrist on the center line C regardless of the size of the wrist, as well as to make constant the distance between the palm and non-contact sensor unit 40 in the image pickup direction.

In the present embodiment, the distance between the left and right inclined surfaces of the wrist guide 20 is set to correspond to a thin wrist, and the wrist guide 20 having the left and right projection portions 20b is constituted as one unit and thus the left and right projection portions 20b are pressed down by the same degree. Although the wrist guide 20 is configured to be pressed down in the present embodiment, another configuration may be employed. For example, the left and right projection portions 20b may slide in the outside is direction by the same distance.

Figure 7:
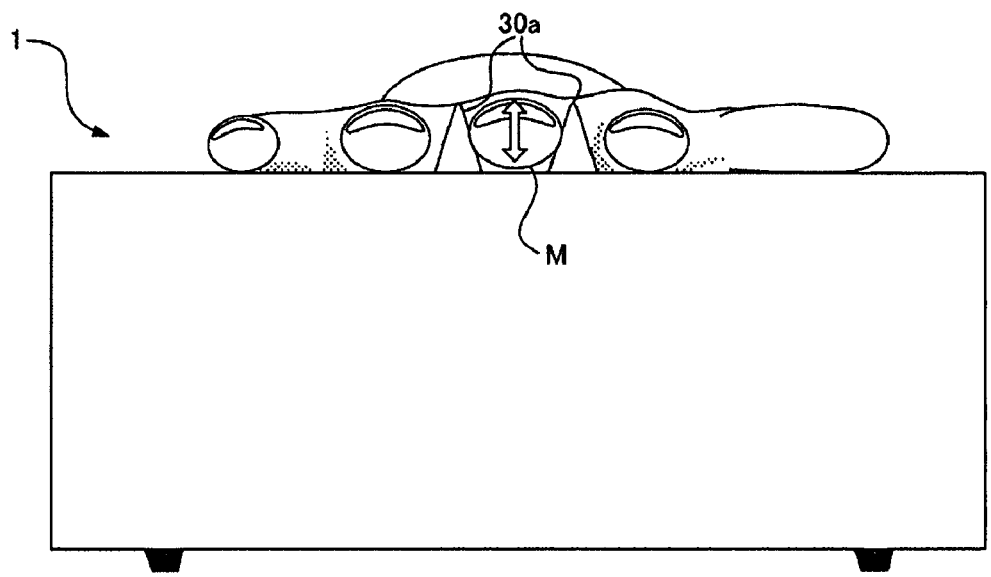
FIG. 7 is a view showing a middle finger fixed in a middle finger guide.
Figure 8:
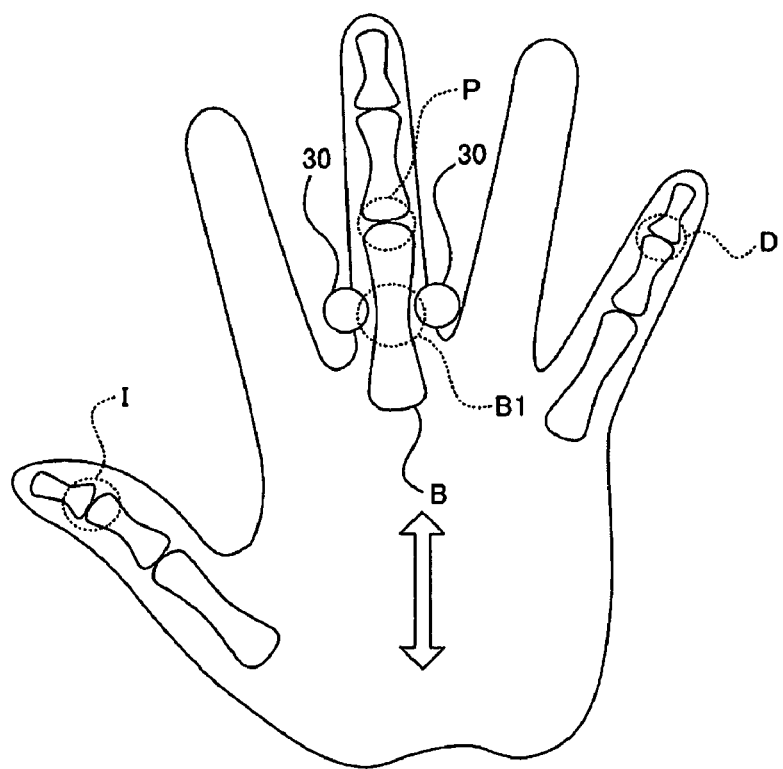
FIG. 8 is a view showing a positional relationship between the middle finger and middle finger guide.

A description will next be given of a configuration of the middle finger guide and its effect. FIG. 7 is a view showing a middle finger fixed in the middle finger guide, and FIG. 8 is a view showing a positional relationship between the middle finger and middle finger guide. FIG. 7 shows a state where the image pickup apparatus is viewed from the front.

As shown in FIG. 7, the cone-like projections 30a and 30a of the middle finger guide 30 position a middle finger M to substantially the center therebetween. Further, the inclined surfaces of the cone-like projections 30a and 30a allows the middle finger guide 30 to accommodate middle fingers of various sizes. For example, it is possible to fix a middle finger thicker than assumed in the middle of the inclined surfaces of the projections 30a and 30a as shown in FIG. 7.

Further, as shown in FIG. 8, the middle finger guide 30 holds a portion between a proximal interphalangeal joint (PIP joint) P of the middle finger and base thereof, especially, a portion B1 at which the width of the proximal phalanx B becomes thinner, thereby preventing movement of the middle finger in the direction denoted by the arrow. At this time, at least a portion of the thumb between its fingertip and interphalangeal joint (IP joint) I and a portion of the little finger between its fingertip and distal interphalangeal joint (DIP joint) D are placed on the placement portion 10.

According to the present embodiment having the above configuration, it is possible for the guide apparatus to accommodate hands of various sizes, as well as to make constant the degree of spread of fingers and position/angle of the palm relative to the non-contact sensor unit 40. As a result, the non-contact sensor unit 40 can photograph the palm at the same position and at the same angle both at the registration time and authentication time.

Figure 9:
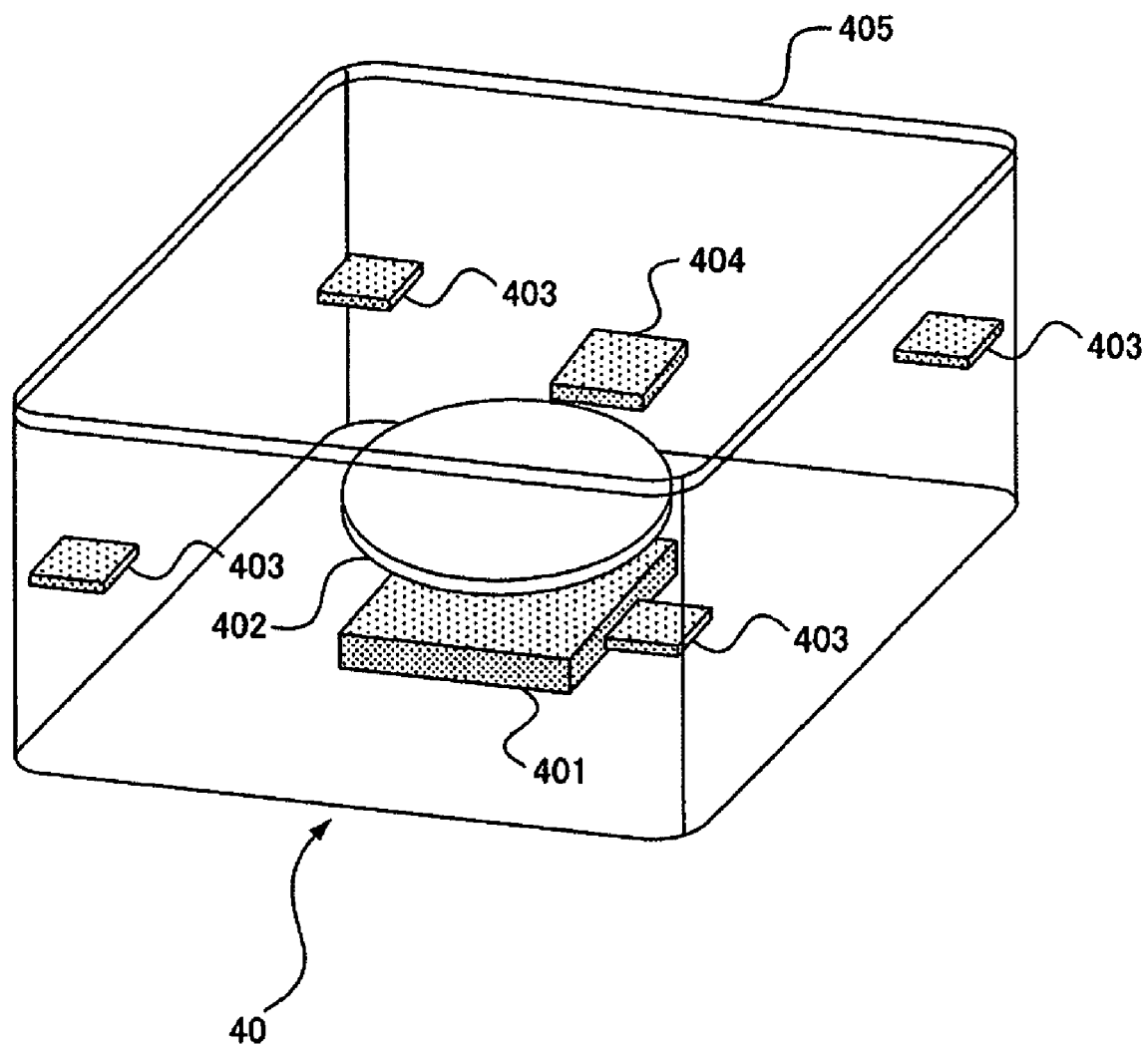
FIG. 9 is a view showing a configuration of a non-contact sensor unit.

A description will next be given of a configuration of the non-contact sensor unit. FIG. 9 is a view showing a configuration of the non-contact sensor is unit.

The non-contact sensor unit 40 has an infrared sensor 401 (image pickup section corresponding to the camera 40a), a condenser lens 402 (image pickup section corresponding to the camera 40a), a near-infrared light-emitting device 403 (image pickup section corresponding to the camera 40a), a distance sensor 404 (detection section), and an infrared filter 405. The near-infrared light-emitting device 403 emits a near-infrared ray in an upward direction to irradiate the palm placed on the image pickup apparatus 1 with the near-infrared ray.

The condenser lens 402 collects a light irradiated to the palm on the image pickup range F shown in FIG. 1 by the near-infrared light-emitting device 403 and reflected therefrom on the infrared sensor 401. The distance sensor 404 detects an object on the non-contact sensor unit 40 and measures the distance between the object and sensor unit 40. The infrared filter 405 shields visible light.

Figure 10:
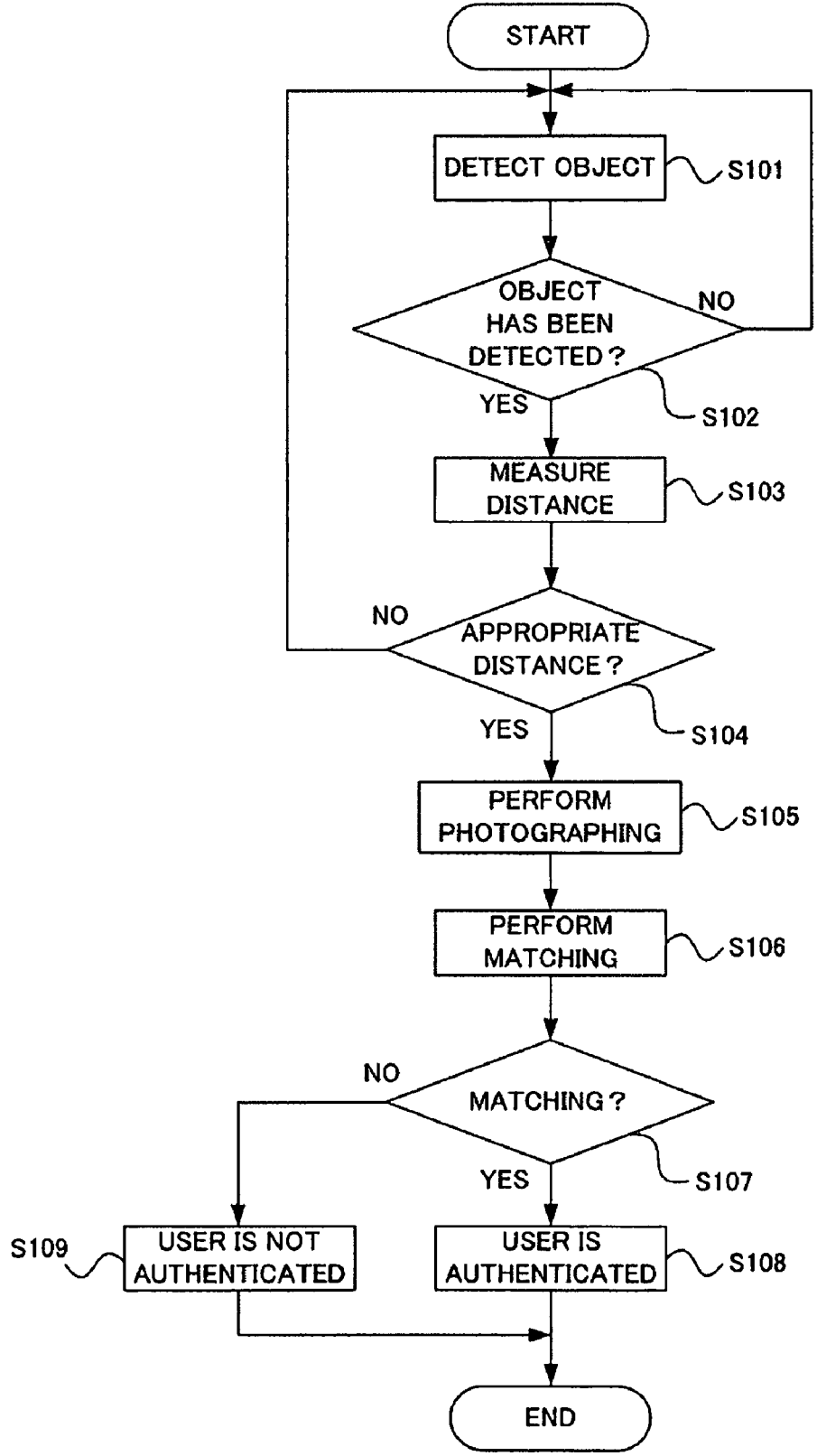
FIG. 10 is a flowchart showing operation of non-contact vein authentication processing.
Figure 11:
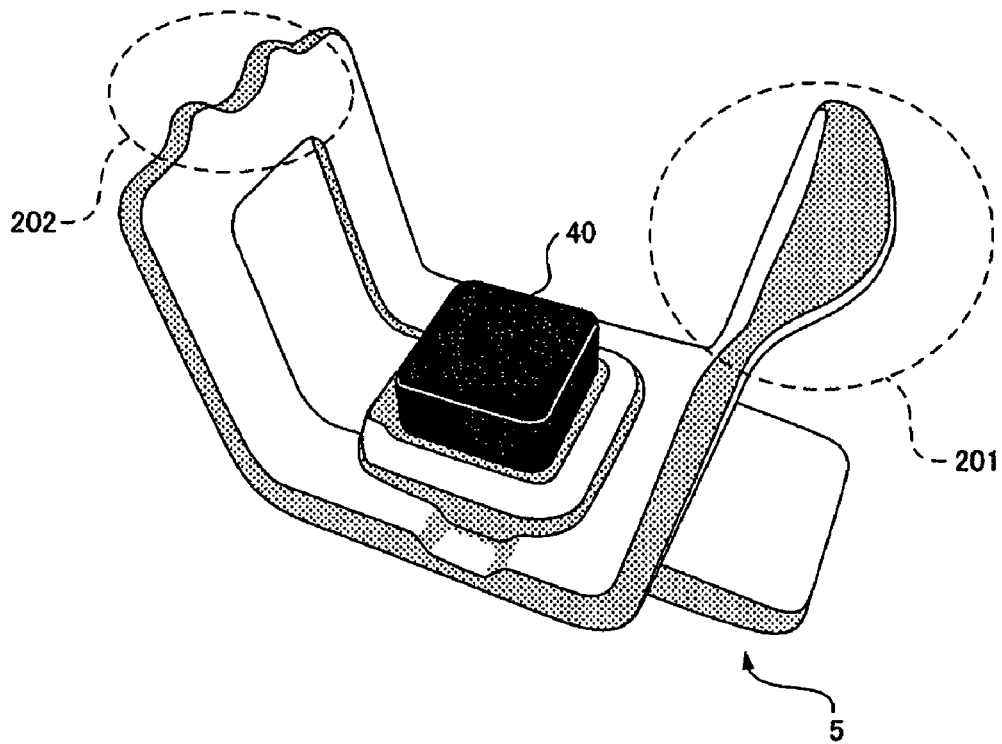
FIG. 11 is a view showing a conventional guide apparatus.
Figure 12:
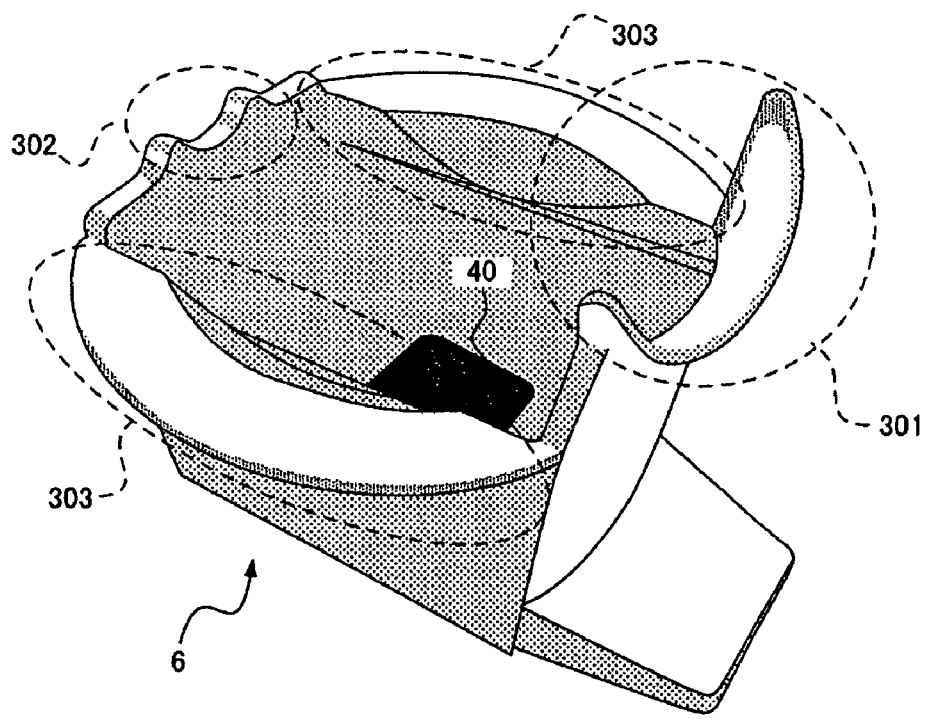
FIG. 12 is a view showing another conventional guide apparatus.
Figure 13:
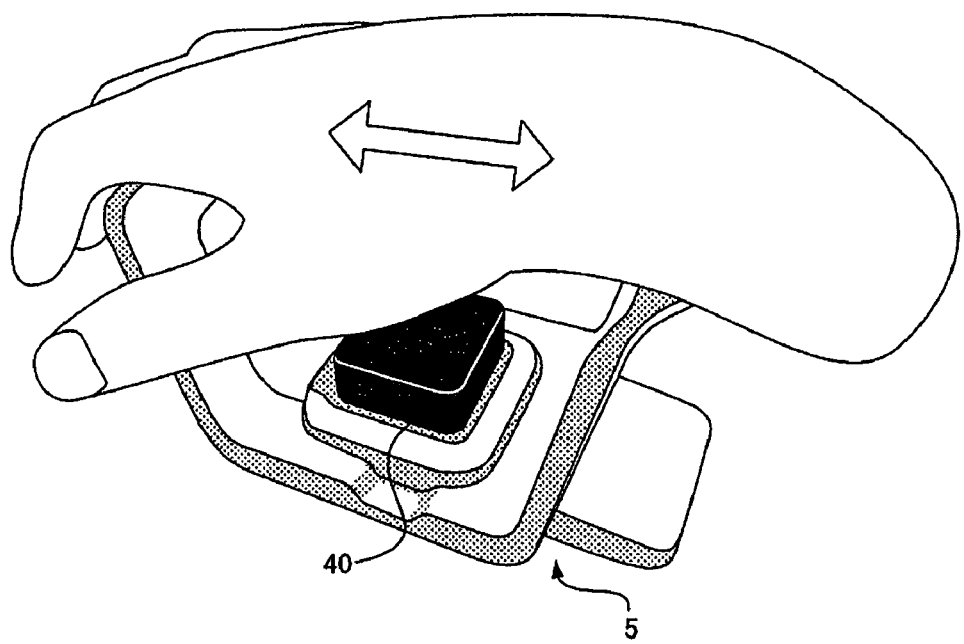
FIG. 13 is a view showing a problem posed in the guide apparatus of FIG. 11.
Figure 14:
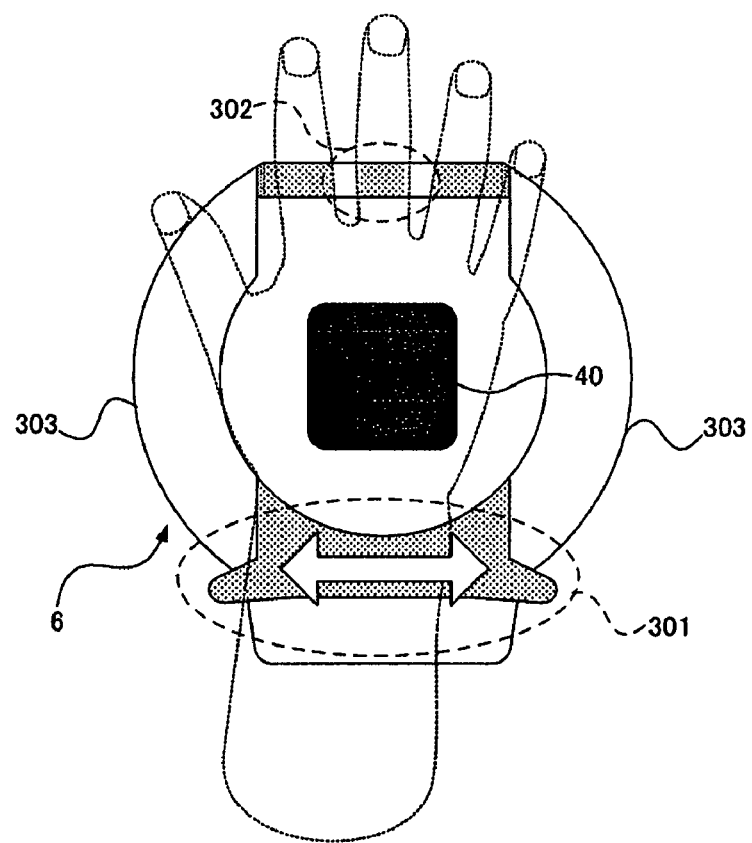
FIG. 14 is a view showing a problem posed in the guide apparatus of FIG. 12.

A description will next be given of non-contact vein authentication processing performed by the image pickup system according to the embodiment. FIG. 10 is a flowchart showing operation of non-contact vein authentication processing. It is assumed that control for the non-contact sensor unit and authentication processing are performed by the personal computer 2 and that a vein pattern image of a target user has previously been registered in the personal computer 2.

The personal computer 2 uses the distance sensor 404 to perform detection (S101) to determine whether there exists an object (palm) on the non-contact sensor unit 40 (S102).

When an object has been detected by the distance sensor 404 (YES in S102), the personal computer 2 uses the distance sensor 404 to measure the distance between the distance sensor 404 and object (S103) and determines whether the measured distance is suitable for photographing a vein pattern (S104).

When determining that the distance between the non-contact sensor unit 40 and object is appropriate (YES in S104), the personal computer 2 uses the infrared sensor 401 to photograph the object (S105) and compares the photographed vein pattern image and registered vein pattern image (S106) to determine whether they match each other (S107).

When the photographed vein pattern image and registered vein pattern image match each other (YES in S107), the personal computer 2 authenticates the user (S108).

On the other hand, when the photographed vein pattern image and registered vein pattern do not match each other (NO in S107), the personal computer 2 does not authenticate the user (S109).

When the distance between the non-contact sensor unit 40 and object is not appropriate (NO in S104), the personal computer 2 uses the distance sensor 404 to detect the distance once again (S101).

When an object is not detected by the distance sensor 404 (NO in S102), the personal computer 2 uses the distance sensor 404 to detect the distance once again (S101).

With the configuration and operation described above, the image pickup system S performs user authentication using the vein pattern of the user's palm. In the above authentication, the palm is guided to the same position both at the registration time and authentication time by using the image pickup apparatus 1, thereby reducing the probability that one person is erroneously recognized as another person.

Further, the personal computer 2 uses the distance sensor 404 to detect the distance between the non-contact sensor unit 40 and object and determine whether the detected distance is appropriate, thereby detecting whether the palm is placed on the placement portion 10.

The present embodiment can be applied not only to the non-contact vein authentication but also to contact type vein authentication. Further, the image is pickup apparatus 1 according to the present embodiment may photograph not only the vein pattern but also lines of the palm. Further, the wrist guide 20 may be used, in place of the distance sensor 404, to detect the placement of the palm on the image pickup apparatus 1. In this case, the placement of the palm on the image pickup apparatus 1 is detected by depression of the wrist guide 20.

As described above, the image pickup apparatus (photographing apparatus) has the placement portion having the opening portion, finger guide, wrist guide, and photographing device provided in the opening portion in order to guide a palm to be photographed to a position suitable for photographing. When a user's left or right hand is placed on the placement portion, at least the second joints of a plurality of fingers are placed on the planar surface of the placement portion, and the middle finger is positioned by the finger guide. The wrist guide, which is provided on the opposite side of the finger guide on the upper surface of the image pickup apparatus with respect to the opening portion, has a pair of inclined surfaces and, when the palm is placed on the placement portion, the both end sides of the wrist contact the inclined surfaces to be positioned. Further, upon contact of the wrist with the wrist guide, the wrist guide moves downward so as to keep the palm parallel to the opening plane of the opening portion.

What is claimed is:

1. A guide apparatus that guides a palm to be photographed by an image pickup apparatus to a position suitable for photographing, comprising:
   a placement portion that has a planar surface on which the palm is placed in an image pickup direction of the image pickup apparatus and that supports the palm placed on the planar surface so that the palm can be photographed by the image pickup apparatus through an opening formed in the planar surface;
   a finger guide that is provided on the placement portion at the one end side of the opening and that positions a predetermined finger placed on the placement portion; and
   a wrist guide that is provided on the placement portion at the other end side (opposite to the one end side) of the opening in a V-shaped manner with respect to the image pickup direction of the image pickup apparatus that supports a wrist and that is movably arranged such that when the wrist is brought into contact with a V-shaped inclined surface, the wrist guide is moved by a load of the wrist and guides the wrist in an inclined direction while moving the palm to a predetermined position with respect to the opening in cooperation with the finger guide.

2. The guide apparatus according to claim 1, wherein the wrist guide is supported by an elastic member and is moved in the direction perpendicular to a planar direction of the planar surface.

3. The guide apparatus according to claim 1, wherein the finger guide is constituted by two finger guide members arranged with a predetermined distance therebetween, and
the predetermined finger is positioned between the finger guide members.

4. The guide apparatus according to claim 3, wherein the finger guide members each have a cone-like shape.

5. The guide apparatus according to claim 1, wherein the finger guide provided on the placement portion holds a middle finger as the predetermined finger and is provided on the placement portion so as to guide the palm to a suitable position for photographing with respect to the opening.

6. The guide apparatus according to claim 5, wherein the finger guide provided on the placement portion holds a portion between a proximal interphalangeal joint of the middle finger and base thereof so as to guide the palm to a suitable position for photographing with respect to the opening.

7. The guide apparatus according to claim 1, wherein the placement portion supports at least a portion of a thumb between its fingertip and interphalangeal joint and a portion of a little finger between its fingertip and distal interphalangeal joint.

8. An image pickup apparatus, comprising:
an image pickup section that photographs a palm;
a placement portion that has a planar surface on which the palm is placed in an image pickup direction of the image pickup apparatus and that supports the palm placed on the planar surface so that the palm can be photographed by the image pickup section through an opening formed in the planar surface;
a finger guide that is provided on the placement portion at the one end side of the opening and that positions a predetermined finger placed on the placement portion; and
a wrist guide that is provided on the placement portion at the other end side (opposite to the one end side) of the opening in a V-shaped manner with respect to the image pickup direction of the image pickup section that supports a wrist and that is movably arranged such that when the wrist is brought into contact with a V-shaped inclined surface, the wrist guide is moved by a load of the wrist and guides the wrist in an inclined direction while moving the palm to a predetermined position with respect to the opening in cooperation with the finger guide.

9. The image pickup apparatus according to claim 8, wherein
the wrist guide is supported by an elastic member and is moved in the direction perpendicular to a planar direction of the planar surface.

10. The image pickup apparatus according to 8, wherein the finger guide is constituted by two finger guide members arranged with a predetermined distance therebetween, and
the predetermined finger is positioned between the finger guide members.

11. The image pickup apparatus according to claim 10, wherein
the finger guide members each have a cone-like shape.

12. The image pickup apparatus according to claim 8, wherein
the finger guide holds a middle finger as the predetermined finger and is provided on the placement portion so as to guide the palm to a suitable position for photographing with respect to the opening.

13. The image pickup apparatus according to claim 12, wherein
the finger guide holds a portion between a proximal interphalangeal joint of the middle finger and base thereof so as to guide the palm to a suitable position for photographing with respect to the opening.

14. The image pickup apparatus according to claim 8, wherein
the placement portion supports at least a portion of a thumb between its fingertip and interphalangeal joint and a portion of a little finger between its fingertip and distal interphalangeal joint.

15. The image pickup apparatus according to claim 8, wherein
the image pickup section photographs an infrared image.

16. An image pickup system, comprising:
an image pickup section that photographs a palm;
a placement portion that has a detection section for detecting the palm set at a position at which an image pickup section can photograph the palm and a planar surface on which the palm is placed in the image pickup direction of the image pickup section and that supports the palm placed on the planar surface so that the palm can be photographed by the image pickup section through an opening formed in the planar surface;
a finger guide that is provided on the placement portion at the one end side of the opening and that positions a predetermined finger placed on the placement portion;
a wrist guide that is provided on the placement portion at the other end side (opposite to the one end side) of the opening in a V-shaped manner with respect to the image pickup direction of the image pickup section that supports a wrist and that is movably arranged such that when the wrist is brought into contact with a V-shaped inclined surface, the wrist guide is moved by a load of the wrist and guides the wrist in an inclined direction while moving the palm to a predetermined position with respect to the opening in cooperation with the finger guide; and
a control unit that allows the image pickup section to photograph the palm in the case where the detection section detects the palm.

17. The image pickup system according to claim 16, wherein
the wrist guide is supported by an elastic member and is moved in the direction perpendicular to the planar direction of the planar surface.

18. The image pickup system according to claim 16, wherein
the finger guide is constituted by two finger guide members arranged with a predetermined distance therebetween, and
the predetermined finger is positioned between the finger guide members.

19. The image pickup system according to claim 18, wherein
the finger guide members each have a cone-like shape.

20. A guide method that guides a palm to a position suitable for photographing in the case where a camera provided in a casing is used to photograph, through an opening formed in the casing, the palm which is guided to the front of the opening, comprising:

providing, at the one end side of the opening, a finger guide for positioning a predetermined finger, and providing, at the other end side (opposite to the one end side) of the opening, a wrist guide for positioning a wrist, wherein when the wrist is brought into contact with an inclined surface provided in a V-shaped manner with respect to an image pickup direction, the wrist guide is moved by a load of the wrist and guides the wrist in an inclined direction while moving the palm to a predetermined position with respect to the opening in cooperation with the finger guide.

* * * * *